(12) United States Patent
Shackleton et al.

(10) Patent No.: US 9,402,113 B1
(45) Date of Patent: Jul. 26, 2016

(54) VISUALIZING VIDEO AUDIENCE RETENTION BY IMPRESSION FREQUENCY

(71) Applicant: Google Inc., Mountain View, CA (US)

(72) Inventors: Lane Shackleton, San Francisco, CA (US); Avi Fein, San Francisco, CA (US); Jason Carlin, Los Angeles, CA (US); Thomas James Broxton, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/244,973

(22) Filed: Apr. 4, 2014

(51) Int. Cl.
*H04N 21/442* (2011.01)
*H04N 21/81* (2011.01)
*H04N 21/45* (2011.01)
*G06Q 30/02* (2012.01)

(52) U.S. Cl.
CPC ....... *H04N 21/8146* (2013.01); *G06Q 30/0244* (2013.01); *G06Q 30/0272* (2013.01); *H04N 21/44213* (2013.01); *H04N 21/44222* (2013.01); *H04N 21/4532* (2013.01)

(58) Field of Classification Search
CPC .......... H04N 21/235; H04N 21/44204; G06Q 30/0204; G06Q 30/0244; G06Q 30/0254; G06Q 30/0255; G06Q 30/0272
USPC .......................................................... 725/14
See application file for complete search history.

(56) References Cited

U.S. PATENT DOCUMENTS

| | | | | |
|---|---|---|---|---|
| 6,286,005 B1 * | 9/2001 | Cannon | ................... | G06Q 30/02 455/2.01 |
| 8,365,213 B1 * | 1/2013 | Orlowski | ........... | G06Q 30/0251 725/13 |
| 8,745,647 B1 * | 6/2014 | Shin et al. | .......................... | 725/9 |
| 2004/0243704 A1 * | 12/2004 | Botelho et al. | ................ | 709/224 |
| 2005/0216339 A1 * | 9/2005 | Brazell | .............. | G06Q 30/0254 705/14.52 |
| 2007/0094609 A1 * | 4/2007 | Gilboa et al. | ................. | 715/762 |
| 2008/0250447 A1 * | 10/2008 | Rowe | ..................... | G06Q 30/02 725/32 |
| 2009/0083417 A1 * | 3/2009 | Hughes | ................... | G06F 15/16 709/224 |
| 2009/0327075 A1 * | 12/2009 | Saadat | ................... | G06Q 30/02 705/14.53 |
| 2010/0161419 A1 * | 6/2010 | Tomlin | ................... | G06Q 30/02 705/14.55 |
| 2011/0010661 A1 * | 1/2011 | Wade et al. | .................... | 715/803 |
| 2011/0288907 A1 * | 11/2011 | Harvey et al. | ................ | 705/7.29 |
| 2013/0024298 A1 * | 1/2013 | Irvine | ................ | G06Q 30/0277 705/14.73 |
| 2013/0080263 A1 * | 3/2013 | Goldman et al. | .......... | 705/14.69 |
| 2013/0247081 A1 * | 9/2013 | Vinson | ............. | H04N 21/44204 725/14 |
| 2015/0235258 A1 * | 8/2015 | Shah | .................. | G06Q 30/0242 705/14.45 |

OTHER PUBLICATIONS

U.S. Appl. No. 61/515,524, filed Aug. 5, 2011, entitled, "Video Segment Play-Through Reporting," 38 pages.

\* cited by examiner

*Primary Examiner* — Pankaj Kumar
*Assistant Examiner* — Alexander Boyd
(74) *Attorney, Agent, or Firm* — Fish & Richardson P.C.

(57) ABSTRACT

Systems and methods for visualizing audience retention for a video as a function of impression frequency are provided. In an aspect, a system includes a reception component configured to receive watch history information for a plurality of users regarding their watch history of a video, and a visualization component configured to generate a visualization based on the watch history information that graphically depicts viewer retention over duration of the video as a function of impression frequency.

18 Claims, 13 Drawing Sheets

VISUALIZING VIDEO AUDIENCE RETENTION BY IMPRESSION FREQUENCY

TECHNICAL FIELD

This application generally relates to systems and methods for visualizing video audience retention as a function of impression frequency.

BACKGROUND

The proliferation of available streaming content is increasing at exponential levels that will soon reach many millions if not billions of available streaming content for viewing. Conventionally, broadcast media has been provided by television or cable channels that are typically provided by a relatively small number of content providers. However, with the ubiquitous nature of media creation and publishing tools, individuals are able to become prolific content creators. This has resulted in the exponential growth of available streaming content as well as available channels for streaming content. As a result, video creators are constantly searching for ways to attract and retain viewers. Understanding how viewers perceive and consume their videos is essential for discovering new and improved ways to achieve this goal.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
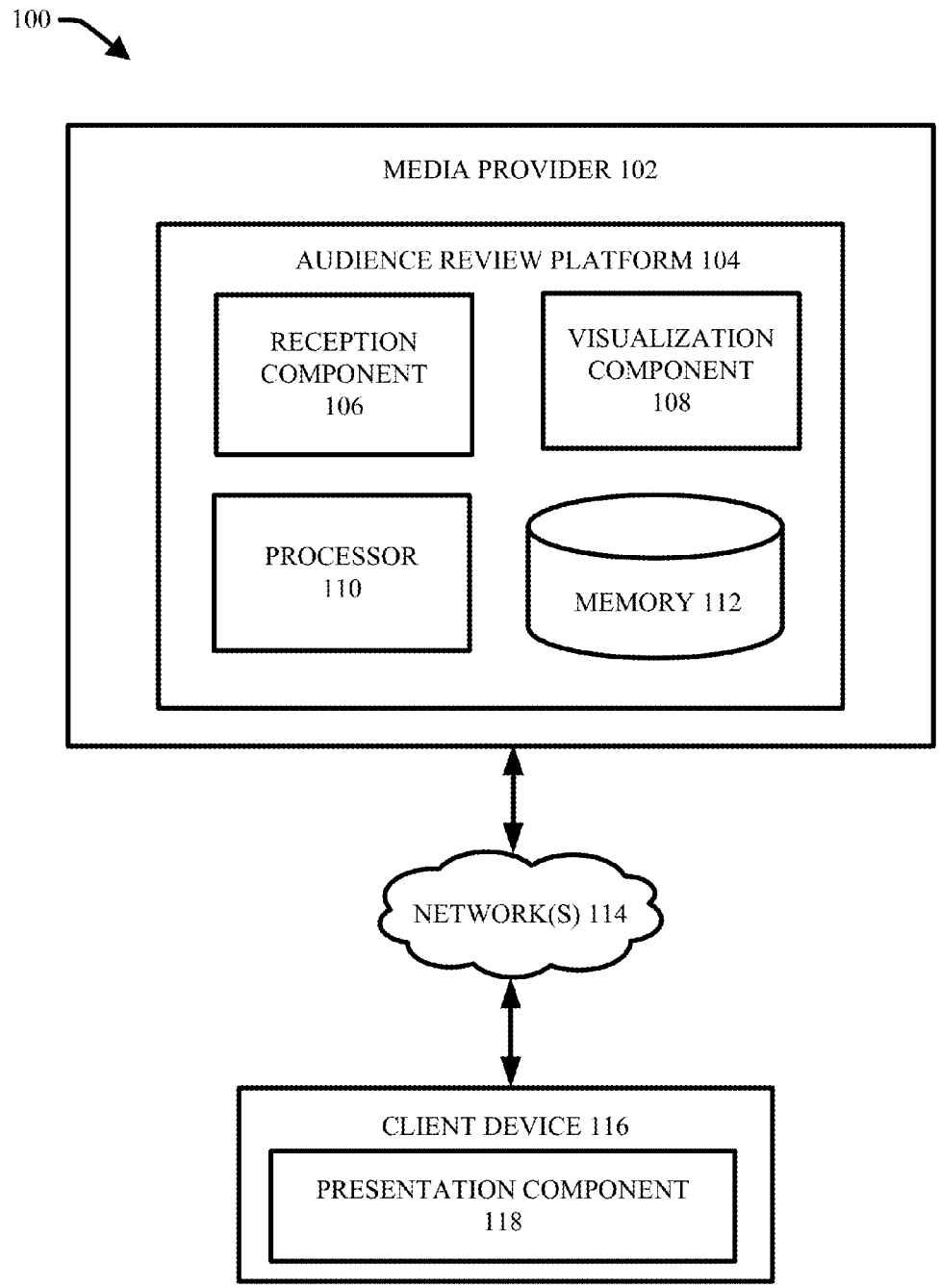
FIG. 1 illustrates an example system for visualizing video audience retention as a function of impression frequency in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods for visualizing audience retention as a function of impression frequency. Audience or viewer retention refers to the number of viewers a video retains over the duration of the video play. For example, at the onset of video play, 100% of the viewers are presented the video, 75% of these viewers may make it through the first 10% of the video, 50% of the viewers may make it through 40% of the video, 25% of the viewers may make it through 75% of the video and 10% of the viewers may make it through the entire video. Audience retention data provides useful insight regarding where certain types of users tend to stop watching a video, such as a video advertisement. This information is helpful to video advertisers wanting to improve audience retention. For example, based on audience retention data for a particular video advertisement, the video advertiser can improve placement of the video advertisement with viewers that tend to watch greater percentages of the video.

Often times, a video advertisement is presented to the same user multiple times to gain viewer attention and affinity for a product based on the mere-exposure effect. However, where viewers have the option to exit the advertisement prior to completion, repeated exposure of some video advertisements to certain users can be useless. For example, where a user exited a video advertisement early the first time it was seen, it is unlikely that the same user will watch the video advertisement to completion when shown a second time. On the contrary, a video advertisement that is frequently re-watched to completion by many users would likely benefit from being represented to these and other users on a regular basis.

Therefore, in addition to audience retention data, information describing how many viewers continue watching a video as it is played when the viewers have been exposed to the video once before, twice before, three times before, etc., is also useful to video advertisers wanting to improve overall audience retention. For example, where audience retention greatly declines after viewers have been presented a video advertisement twice before, the video advertiser can set a maximum exposure threshold for exposure of the video advertisement to a same user. The number of times a single user has been presented or played a video is referred to herein as impression frequency.

The subject disclosure provides a new way of processing and visualizing audience retention data as a function of impression frequency. In an aspect, a visualization is generated that graphically depicts how users watch a video over multiple impressions of the video. For example, a graph can be generated that charts percentage of users watching a video at respective points throughout the progression of a video. The users can be divided into different audience groups or user buckets, wherein each audience group or user buck includes users that have been presented the video different numbers of times (e.g., first audience group includes users that have been presented the video once, second audience group includes users that have been presented the video twice, etc.). Each of the different audience groups or user buckets can be distinguished from one another on the graph.

With the subject visualization techniques, a single graph or visualization can present information that compares audience retention for a given video with respect to different audience impression groups. As a result, an advertiser can easily look at a visualization for a video advertisement and understand that 30% of users who saw the video twice made it to halfway through the video (e.g., 50% of the video was played before the 30% of users stopped watching the video) as compared to 60% of users who saw the video for the first time.

In one or more aspects, a system is provided that includes a system includes a reception component configured to receive watch history information for a plurality of users regarding their watch history of a video, and a visualization component configured to generate a visualization based on the watch history information that graphically depicts viewer retention over duration of the video as a function of impression frequency.

In another aspect, a method is disclosed that includes using a processor to execute the following computer executable instructions stored in a memory to perform the following acts: receiving watch history information for a plurality of users regarding their watch history of a video, and generating a visualization based on the watch history information that graphically depicts viewer retention over duration of the video as a function of impression frequency.

Further provided is a tangible computer-readable storage medium comprising computer-readable instructions that, in response to execution, cause a computing system to perform various operations. These operations include identifying receiving information for a plurality of users regarding their watch history of a video, and generating a visualization based on the information that graphically depicts viewer retention over duration of the video as a function of impression frequency, wherein viewer retention over the duration of the video refers to percentages of the plurality of users that have viewed the video up to respective points in the video, and wherein impression frequency relates to number of times the video has been presented to respective users of the plurality of users.

Referring now to the drawings, with reference initially to FIG. 1, presented is diagram of an example system 100 for visualizing audience retention data as a function of impression frequency, in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes media provider 102, client device 116 and one or more networks 114 for connecting media provider 102 and client device 116. Media provider 102 can include an entity configured to provide media (e.g., streaming video or audio) to a client device 116 via a network 114. Media provider 102 includes audience review platform 104 to facilitate processing audience retention data and impression frequency data related to video consumption at media provider 102. For example, audience review platform 104 can generate a visualization that illustrates audience retention for a video advertisement as a function of audience impression frequency. In an aspect, the visualization can be presented to a user of client device 116 via a graphical user interface (GUI) generated at client device 116 via presentation component 118.

Figure 11:
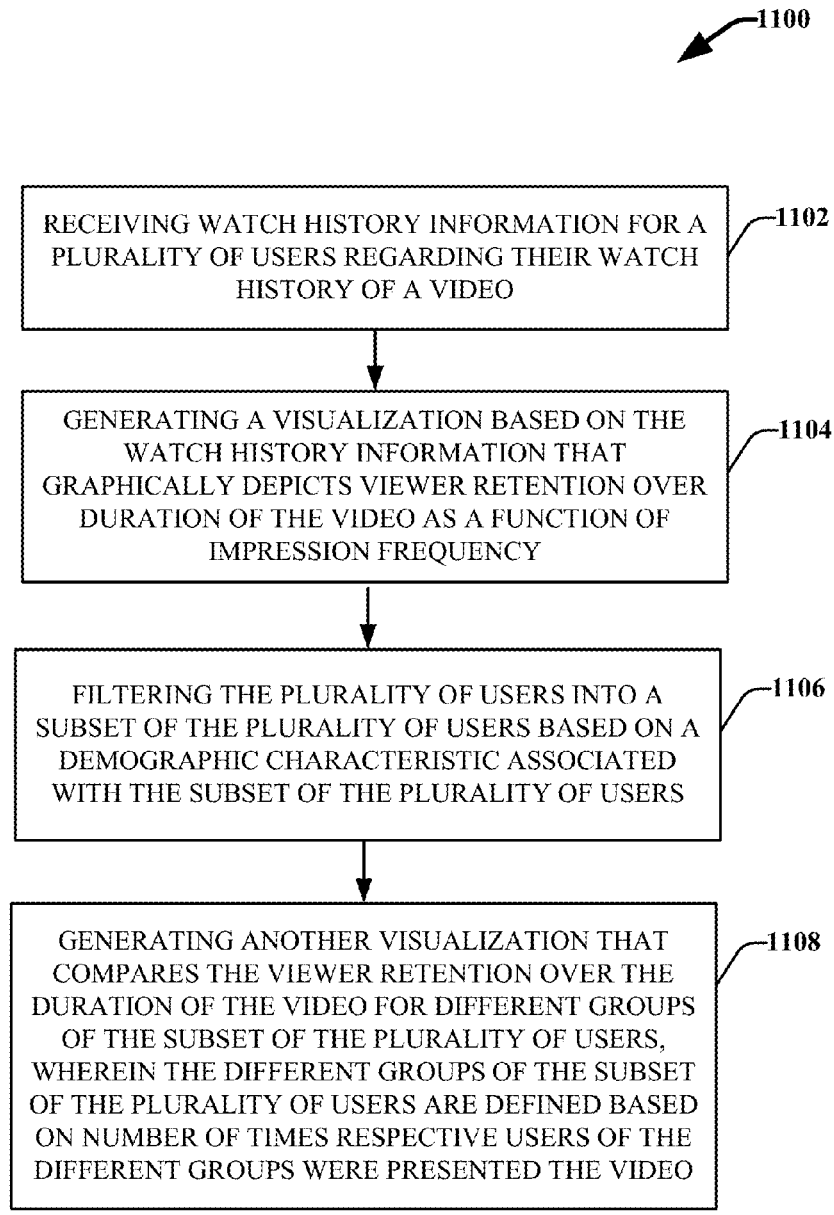
FIG. 11 is a flow diagram of another example method for visualizing video audience retention as a function of impression frequency in accordance with various aspects and embodiments described herein.

Generally, audience review platform 104 can include memory 112 that stores computer executable components and processor 110 that executes computer executable components stored in the memory, examples of which can be found with reference to FIG. 11. It is to be appreciated that although audience review platform 104 is illustrated as being a component internal to media provider 102, such implementation is not so limited. For example, audience review platform 104 (and/or one or more components of audience review platform 104) can be included in client device 116, another content server, a cloud, and/or a media player.

Media provider 102 can include an entity that provides media content (e.g., video, streaming video, live streaming video, video advertisements, animations, images, thumbnails or other dynamic or static representations of video) to a client device 116 via a network 114 (e.g., the Internet). Client device 116 can include presentation component 118 to generate a user interface (e.g., a graphical user interface or virtual interface) that displays media content provided by media provider 102 to a user of the client device. In an aspect, presentation component 118 can include an application (e.g., a web browser) for retrieving, presenting and traversing information resources on the World Wide Web. For example, media provider 102 can provide and/or present media content to a client device 116 via a website that can be accessed using a browser of the client device 116. In another example, media provider 102 can provide and/or present media content to a client device 116 via a cellular application platform. According to this application, presentation component 118 can employ a client application version of the media provider that 102 that can access the cellular application platform of media provider 102. In an aspect, the media content can be presented and/or played at client device 116 using a video player associated with media provider 102 and/or client device 116.

Client device 116 can include any suitable computing device associated with a user and configured to interact with media provider 102, and/or audience review platform 104. For example, client device 116 can include a desktop computer, a laptop computer, a television, an Internet enabled television, a mobile phone, a smartphone, a tablet personal computer (PC), or a personal digital assistant PDA. As used in this disclosure, the terms "content consumer" or "user" refer to a person, entity, system, or combination thereof that employs system 100 (or additional systems described in this disclosure) using a client device 116. Network(s) 114 can include wired and wireless networks, including but not limited to, a cellular network, a wide area network (WAD, e.g., the Internet), a local area network (LAN), or a personal area network (PAN). For example, client device 116 can communicate with media provider 102 (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks.

In an embodiment, audience review platform 104 includes reception component 106 and visualization component 108. Reception component 106 is configured to receive data from media provider 102 or an external system/source (e.g., via a network 114) regarding a plurality of user's watch history of a video. In particular, reception component 106 is configured to receive at least audience or viewer retention information for the video and viewer impression frequency information for the video. In an aspect, reception component 106 can extract audience or viewer retention information and viewer impression frequency information for a video from watch histories of a plurality of users that have been presented the video.

As described above, audience or viewer retention information for a video (e.g., a video advertisement) includes information identifying respective amounts of the video watched by viewers after initiation of playing of the video for watching by the viewers. The video can include any suitable type of video having any suitable duration. However, various aspects of the subject disclosure will be exemplified in association with analysis of audience retention and impression frequency data associated with a video advertisement (e.g., a streaming video advertisement played before, during, or after the playing of another primary video). In an aspect, audience retention information identifies a percentage or number of users who were still watching a video at any given point in the video with respect to the total number of users who began watching the video. For example, audience retention information for a video can indicate that 37% of viewers that began watching the video remained at time marker 00:02:33 or that 60% of the viewers that began watching the video made it past the 30 second time marker. Viewer retention information for a video can also identify respective points in the video where viewers drop off or stop watching the video.

Viewer impression frequency information refers to number of times respective viewers of a video have been presented the video. For example, video advertisements are often played in association with a same or different video, to a same user multiple times. In an aspect, each time a user watches a video, the user's interaction and/or watch duration is noted (e.g., in a video log that records user interaction with the video, in the user's watch history) along with information indicating the number of times the user has been presented the video.

In an aspect, reception component 106 is configured to receive audience retention information and viewer impression frequency information for a video (e.g., from information logs associated with media provider 102 such as user watch history logs, a video log that records user interaction with the video, etc.). In another aspect, reception component 106 can receive and/or filter audience retention information for a video as a function of viewer impression frequency. In particular, reception component 106 can receive and/or filter information for a video that identifies how different audience groups view a video, wherein the different audience groups are organized/filtered based on number of times the respective members of the group have been presented the video. For example, reception component 106 can receive and/or generate viewer retention information for a video that describes percentages of viewers that have viewed the video up to respective points in the video when the viewers watched the video at first impression (e.g., the first time the viewers were presented the video). In addition, reception component 106 can receive and/or generate viewer retention information for the video that describes percentages of viewers that have viewed the video up to respective points in the video when the viewers watched the video at second impression, third impression, fourth impression, etc.

It should be appreciated that a single user will be accounted for multiple times when the user has been presented the video more than once. For example, a user that is included in the fourth impression group (e.g., the impression group that has seen the video four times), will also be included in the first, second and third impression group. However, variance in the user's viewing session with respect to how long the user watched the video (e.g., and any other data associated with the user's viewing session) for each impression of the video will be accounted for.

Visualization component 108 is configured to generate or configure a visualization for a video based on viewer retention and impression frequency information received/generated by reception component 106 that graphically depicts viewer retention over duration of the video as a function of impression frequency. The visualization can be rendered/presented at a client device 116 via presentation component 118. In an aspect, visualization component 108 can generate a graph that charts percentage of users watching a video at respective points throughout the progression of the video. The users can be divided into different audience groups or user buckets, wherein each audience group or user buck includes users that have been presented the video different numbers of times (e.g., first audience group includes users that have been presented the video once, second audience group includes users that have been presented the video twice, etc.). Each of the different audience groups or user buckets can be distinguished from one another on the graph.

Visualization component 108 combines audience retention and audience impression frequency data for a video into a single visualization. As a result, when looking at the visualization, a user can easily discern how viewers drop off from watching the video over the course of the video in general, and how viewers drop off from watching the video over the course of the video with respect to different impressions of the video. For example, an advertiser can easily look at a visualization for a video advertisement generated by visualization component 108 and understand that 30% of users who saw the video twice made it to halfway through the video (e.g., 50% of the video was played before the 30% of users stopped watching the video) as compared to 60% of users who saw the video for the first time.

The form and type of visualization generated by visualization component 108 can vary. In an aspect, visualization component 108 can generate a bar graph or a line graph. However, it should be appreciated that other graphical depictions that can interpret at least audience retention data as a function of audience impression frequency for a video are considered within the scope of the subject disclosure. For example, other graphical visualizations can include but are not limited to: a stacked area graph, a stepped area graph, a pie chart, a histogram, or a three dimensional graph.

Figure 2:
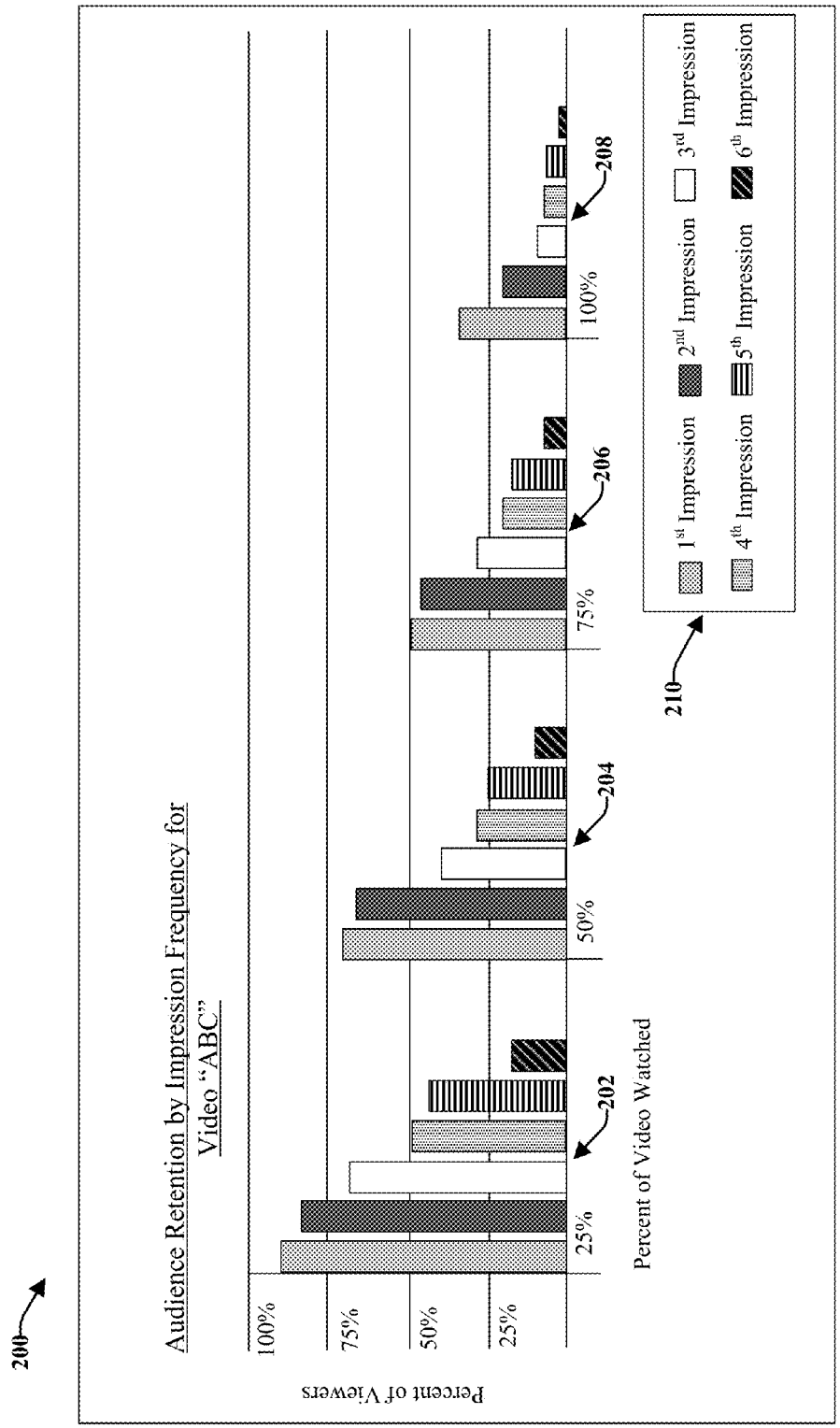
FIG. 2 presents an example visualization that charts audience retention as a function of impression frequency for a video in accordance with various aspects and embodiments described herein.

FIG. 2 presents an example visualization 200 generated by visualization component 108 that charts audience retention as a function of impression frequency for a video. Visualization 200 is a bar graph for a video entitled "ABC." A first axis of the graph corresponds to percent of the video watched at each quartile. For example, the horizontal or x-axis includes sequential markers corresponding to 25% of the video watched, 50% of the video watched, 75% of the video watched, and 100% of the video watched. It should be appreciated that other metrics can be employed along the horizontal or x-axis to indicate progression of the video (e.g., more granular percentages of the video watched, sequential segments of the video watched, sequential points in the video watched, sequential points in the video where viewers dropped off, sequential points in the video where viewers selected an overlay link, etc.).

A second axis of the graph corresponds to percent of viewers. For example, the vertical or y-axis includes sequential markers corresponding to 25% of the viewers, 50% of the viewers, 75% of the viewers, and 100% of the viewers. Sets of bars (e.g., set 202, set 204, set 206 and set 208) are provided at respective markers along the horizontal axis that extend vertically as a function of the percent of viewers retained at the respective amounts or percentages of the video watched. For example, the set of bars located at marker "25% of the video watched" extend to points along the vertical axis based on percentage of viewers that have watched 25% of the video.

In order to distinguish between different impression groups (e.g., groups of the viewers that have seen the video different number of times), each of the sets of bars can include a plurality of sub-bars that respectively correspond to the different impression groups. For example, as identified in legend 210, each set of bars includes six sub-bars corresponding to six audience impression groups (e.g., first impression, second impression, third impression, fourth impression, fifth impression, and sixth impression). It should be appreciated that the number of impression groups represented via the graph (and corresponding sub-bars) can vary. The sub-bars can be distinguished from one another in appearance. For example, the sub-bars can be distinguished from one another in color and/or fill pattern.

Each of the six sub-bars respectively included the sets of bars extend vertically from the horizontal axis as a function of the percent of viewers included in the impression groups represented by the respective sub-bars, retained at the respective amounts of the percentages of the video watched. For example, the sub-bar corresponding to the 1st impression group located at marker "75% of the video watched" extends to point the 50% marker for percentage of viewers, indicating that 50% of viewers make it through 75% of the video upon 1st impression.

Figure 3:
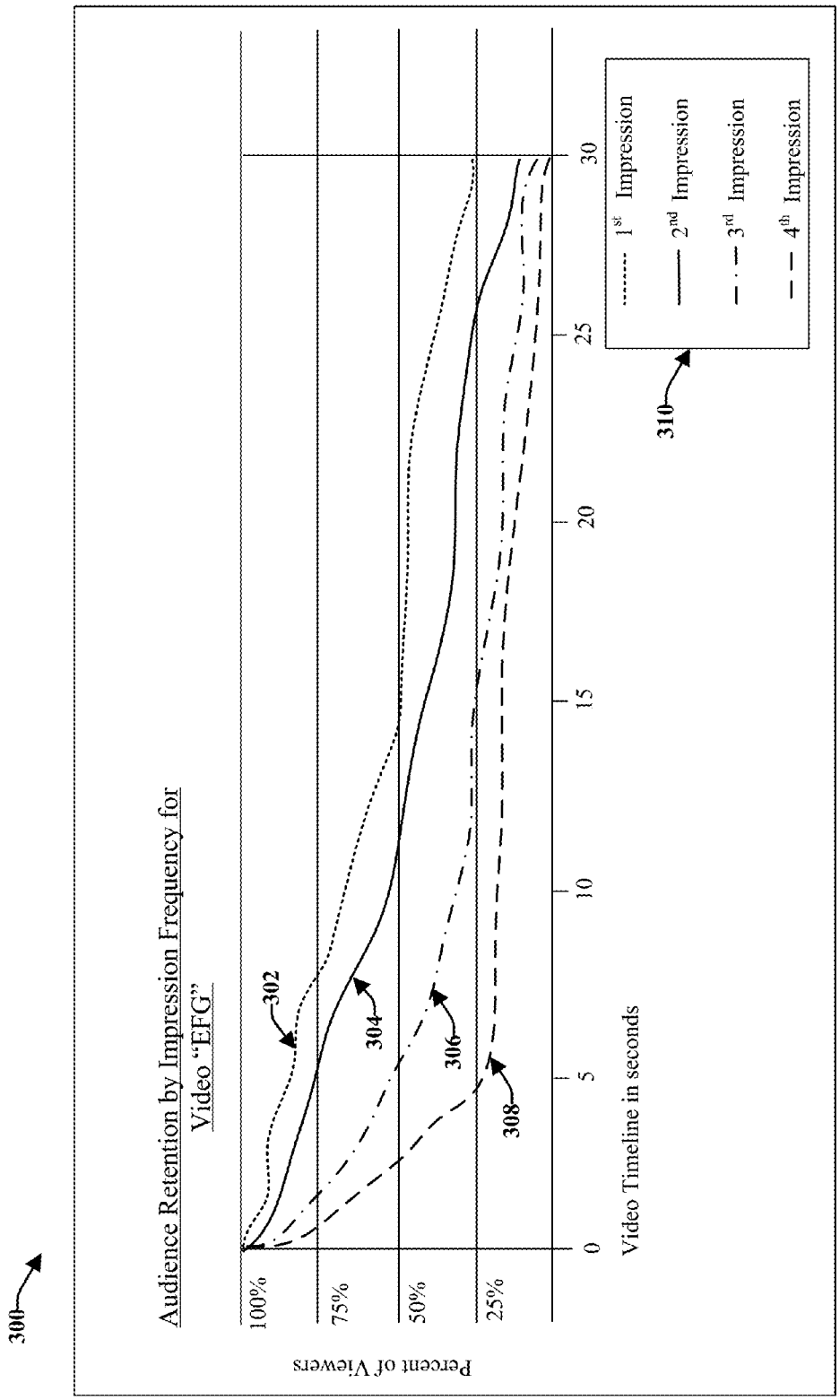
FIG. 3 presents another example visualization that charts audience retention as a function of impression frequency for a video in accordance with various aspects and embodiments described herein.

FIG. 3 presents another example visualization 300 generated by visualization component 108 that charts audience retention as a function of impression frequency for a video. Visualization 300 is a line graph for a video entitled "EFG." A first axis of the graph corresponds to sequential time markers in a video. For example, the horizontal or x-axis includes sequential markers corresponding to 0, 5, 10 15, 20, 25, and 30 second time markers in a 30 second video. It should be appreciated that other metrics can be employed along the horizontal or x-axis to indicate progression of the video (e.g., percentages of the video watched, sequential segments of the video watched, sequential points in the video watched, sequential points in the video where viewers dropped off, sequential points in the video where viewers selected an overlay link, etc.).

A second axis of the graph corresponds to percent of viewers retained. For example, the vertical or y-axis includes sequential markers corresponding to 25% of the viewers, 50% of the viewers, 75% of the viewers, and 100% of the viewers. Lines 302, 304, 306 and 308 are generated by visualization component 108 as a function of percentages of viewers, respectively included in the impression groups represented by the lines, to remain watching the video at respective sequential times in the video. In particular, lines 302, 304, 306 and 308 show the decline in viewer percentage over progression of the video from start to finish for different impression groups. For example, as identified in legend 310, line 302 corresponds to a first impression group, line 304 corresponds to a second impression group, line 306 corresponds to a third impression group and line 308 corresponds to a fourth impression group. The lines corresponding to the different impression groups can be differentiated from one another (e.g., via pattern, texture, color, etc.).

As seen by looking at visualization 300, as impression frequency decreases, view retention also decreases. For example, when comparing the first and fourth impression groups, it can be seen that over 75% of the viewers watched the video past the 5 second marker when seeing the video for the first time while less than 25% of the viewers watched the video past the 5 second marker when seeing the video for the fourth time.

Referring back to FIG. 1, in an aspect, in addition to analyzing and processing audience retention data as a function of viewer impression frequency, audience review platform 104 is configured to process a variety of other data related to video consumption as a function of impression frequency. In particular, in addition to how much of a video a user watches each subsequent impression to the video, various other reactions of the user to the video each subsequent impression to the video can provide rich information regarding the user and the video itself. For example, preferences and behaviors of the user can be inferred based on the user's reaction/interaction with a video upon subsequent impressions. In another example, where a user's skip forward past content of a video after a first impression, it can be inferred that the content of the video skipped over is considered uninteresting by many users. Accordingly, in addition to information relating audience retention to impression frequency, reception component 106 can receive a variety of other rich information associated with user watch history of a video that can vary based on impression frequency. Visualization component 108 can further generate a visualization that graphically depicts this other rich information as a function of impression frequency.

For example, reception component 106 can receive information related to how a user interacts with a video with respect to each user impression of a video and visualization component 108 can generate a visualization that demonstrates variance in user interaction with a video based on impression frequency. For instance, reception component 106 can receive information regarding a user's interaction with the video, including but not limited to: pausing, playing, rewinding, fast forwarding, seeking forward, or seeking backward. According to this example, visualization component 108 can generate a graph or chart the depicts how user's interact with a video with respect to pausing, playing rewinding, etc., based on impression frequency.

In another example, reception component 106 can receive information related to hyperlink selection associated with a video with respect to impression frequency and visualization component 108 can generate a visualization that depicts variance in hyperlink selection based on impression frequency. For example, video can often include hyperlinks to other sources, such as a hyperlink to a website associated with a product advertised in the video, a hyperlink to purchase a product advertised in the video, a hyperlink to a social networking profile associated with the video, or a hyperlink to another video or channel, a hyperlink to share the video (e.g., at a social networking source, with another user vie an electronic message, etc.). According to this example, reception component 106 can receive information regarding what hyperlinks a users selects and at what point the user select them in association with each viewing/impression of a video. Visualization component 108 can generate a visualization that depicts percentages of users that select a hyperlink, and/or timing of hyperlink selection, as a function of impression frequency. Similarly, visualization component 108 can generate a visualization that depicts video advertisement conversion as a function of impression frequency based on information received by reception component 106.

In other aspects, rather than comparing user retention over the course of a video with impression frequency, visualization component 108 can generate a visualization that compares percentages of users to view key parts of the video or to make it to key time points in the video, as a function of impression frequency. For example, a video advertisement can be associated with a time marker, wherein only viewing past the time marker is considered relevant to the video advertisement (e.g., for billing purposes or other purposes). A video advertisement can also be associated with an option to skip or exit the video advertisement after the passing of a predetermined minimum amount of time. For example, while viewing a video advertisement, a pop up skip button can be displayed that allows the viewer to select the button and exit the video advertisement after the passing of a predetermined amount of time (e.g., 5 seconds, 10 seconds, 15 seconds, etc.). According to this example, visualization component 108 can generate a graphical representation (e.g., a histogram) that shows percentages of viewers to make it past the key time markers, (e.g., past advertisement skipping point, past billable point, etc.) as a function of impression frequency.

Figure 4:
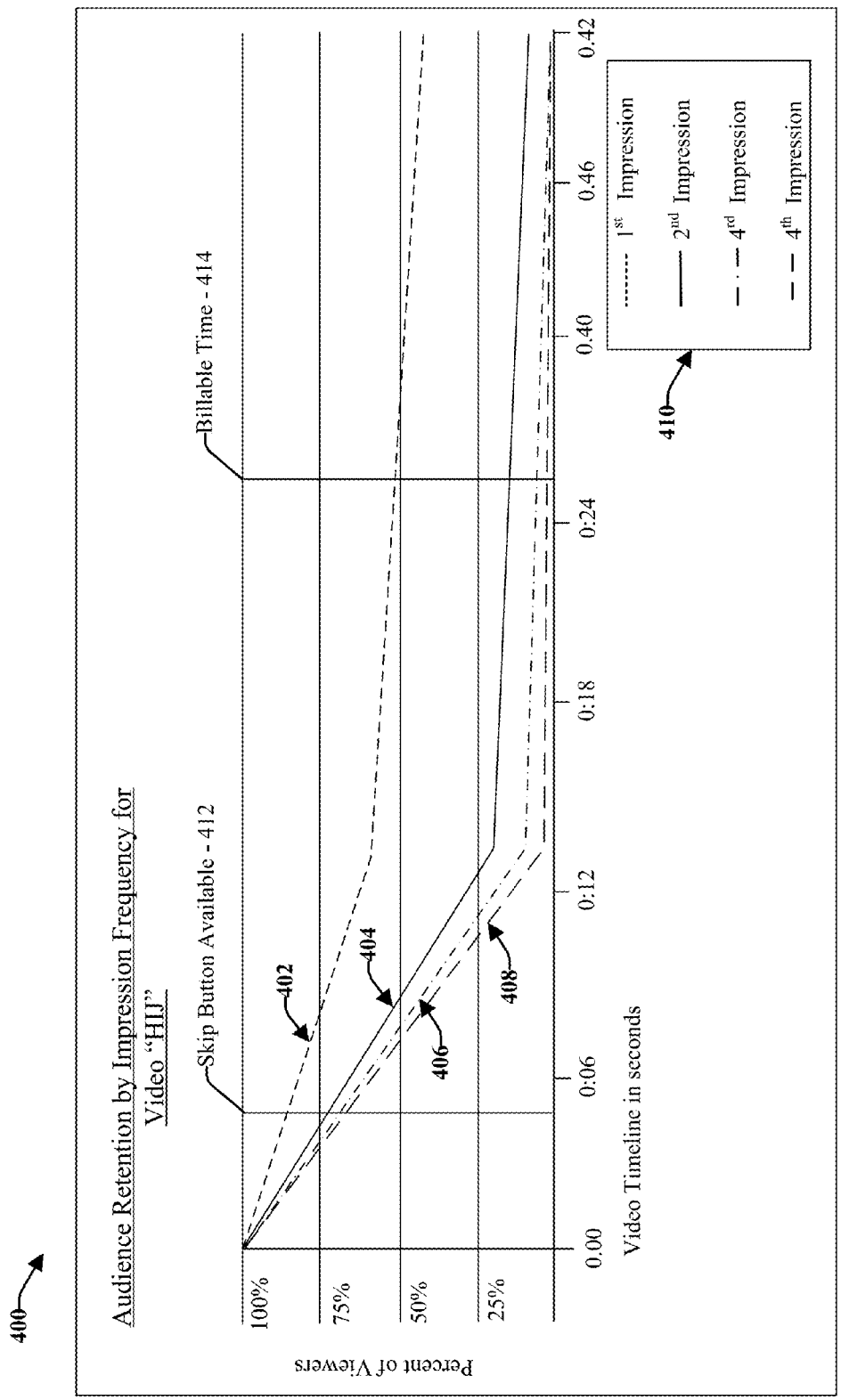
FIG. 4 presents another example visualization that charts audience retention as a function of impression frequency for a video in accordance with various aspects and embodiments described herein.

For example, FIG. 4 presents another example visualization 400 generated by visualization component 108 that charts percentages of viewers to view a video advertisement past various key time markers in a video as a function of impression frequency for the video. Visualization 400 is a line graph for a video advertisement entitled "HU." In an aspect, video advertisement HIJ is played before or during the playing of another primary video. Similar to visualization 300, a first axis of the graph corresponds to sequential time markers in a video. For example, the horizontal or x-axis includes sequential markers corresponding to times 0:00, 0:06, 0:12, 0:18, etc. A second axis of the graph corresponds to percent of viewers retained. For example, the vertical or y-axis includes sequential markers corresponding to 25% of the viewers, 50% of the viewers, 75% of the viewers, and 100% of the viewers. Lines 402, 404, 406 and 408 are generated by visualization component 108 as a function of percentages of viewers, respectively included in the impression groups represented by the lines, to remain watching the video at respective sequential times in the video. In particular, lines 402, 404, 406 and 408 show the decline in viewer percentage over progression of the video from start to finish for different impression groups. For example, as identified in legend 410, line 402 corresponds to a first impression group, line 404 corresponds to a second impression group, line 406 corresponds to a third impression group and line 408 corresponds to a fourth impression group. The lines corresponding to the different impression groups can be differentiated from one another (e.g., via pattern, texture, color, etc.).

In addition, visualization 400 includes vertical markers in the body of the graph to indicate time points in the video associated with key points. For example, marker 412 indicates the point in the video where a button to skip the video advertisement is available. Marker 414 indicates a point in the video where viewing there past is considered billable. As seen by looking at visualization 400, as impression frequency increases, the percentage of viewers to not select the skip button and to make it past the billable time marker significantly decreases.

Referring back to FIG. 1, in another aspect, reception component 106 can receive information regarding different actions a user performs over the course of a video and following watching of a video as a function of impression frequency. A user can perform various actions in response to a video advertisement while watching the video advertisement and after watching the video advertisement. For example, a user can select an option to skip the advertisement after passage of an amount of time and view a primary video associated with the advertisement. In another example, a user can exit or abandon the primary video and advertisement all together in response to presentation of a video advertisement. In another example, a user can watch the advertisement to completion and then watch the primary video or exit the primary video to view other content (e.g., a website associated with the advertisement, a new channel, a new video, etc.). Still in yet another example, while watching or after watching a video, a user can comment on the video, share the video, like the video, etc.

The different actions/paths a user takes in response to viewing a video (such as a video advertisement), can vary based on the different impressions of the video. For example, when a user sees a video advertisement for the first time, the user may watch it to completion and exit the primary video to view a website associated with the video advertisement. However, when the user sees the video for a second time, the user may skip the advertisement and continue to the primary video associated with the advertisement after passage of a minimum amount of required advertisement watch time. The manner in which a user reacts to different impressions of a video can provide strong insight into whether repeated exposure of the user to the video is beneficial, depending on the type of reaction desired by the video owner in response to the repeated exposure.

Accordingly, visualization component 108 can also be configured to generate a visualization that graphically depicts different actions users performs in response to presentation of a video as a function of impression frequency. In an aspect, such a visualization can take the form of a sankey diagram wherein different arrows can extend from points in a graph representative of time points in a video where a user performs a reaction to the video. Different arrows or groups of arrows can respectively represent a different user action. Further, different arrows or groups of arrows and can be represented by a different color or fill pattern to distinguish between different user impression groups.

Figure 5:
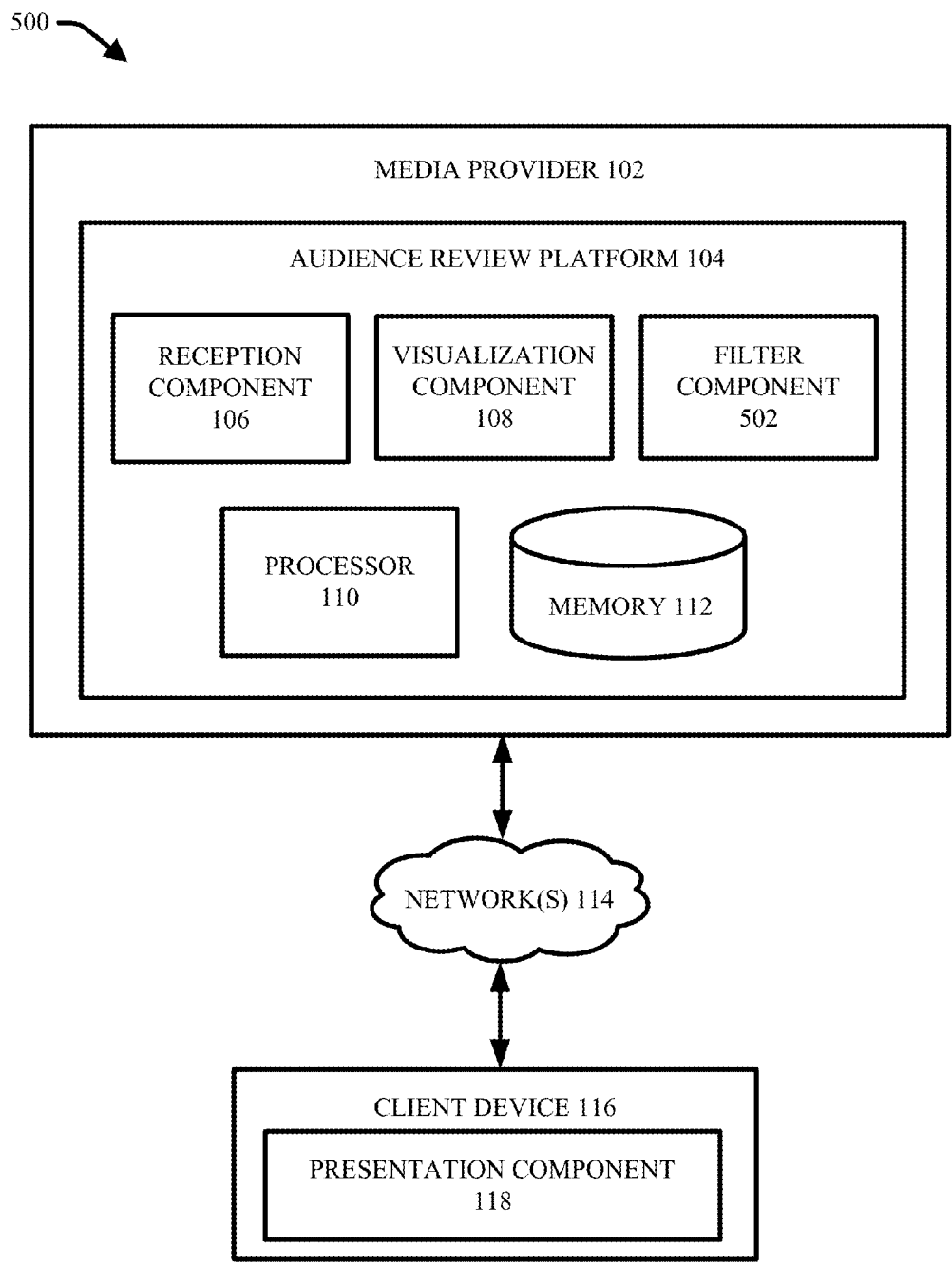
FIG. 5 illustrates another example system for visualizing video audience retention as a function of impression frequency in accordance with various aspects and embodiments described herein.

FIG. 5 presents a diagram of another example system 500 for visualizing audience retention data as a function of impression frequency, in accordance with various aspects and embodiments described herein. System 500 includes same or similar features and functionalities as system 100 with the addition of filter component 502 to audience review platform 104. Repetitive description of like elements employed in respective embodiments of systems described herein is omitted for sake of brevity.

Filter component 502 is configured to facilitate generation of different versions or pivots of visualizations generated by visualization component 108 based on various characteristics associated audience subsets. In particular, rather than generating a visualization depicting relationships between aspects associated with video consumption (e.g., viewer retention, hyperlink selection, etc.) that vary based on video impression frequency for all audience members or viewers, filter component 502 can identify a subset of audience members to represent in a visualization. Accordingly, visualization component 108 can generate multiple different visualizations for different subsets of audiences. These multiple different visualizations can be compared to one another to assist in analyzing and interpreting differences in audience groups with respect to video consumption based on impression frequency. The subset of audience members or viewers can be filtered based on various factors including by not limited to: a demographic characteristic (e.g., age, gender, ethnicity, occupation, marital status, language, etc.), a user preference, user watch history, a user interest, a social affiliation, a user context, or a user location.

Figure 6:
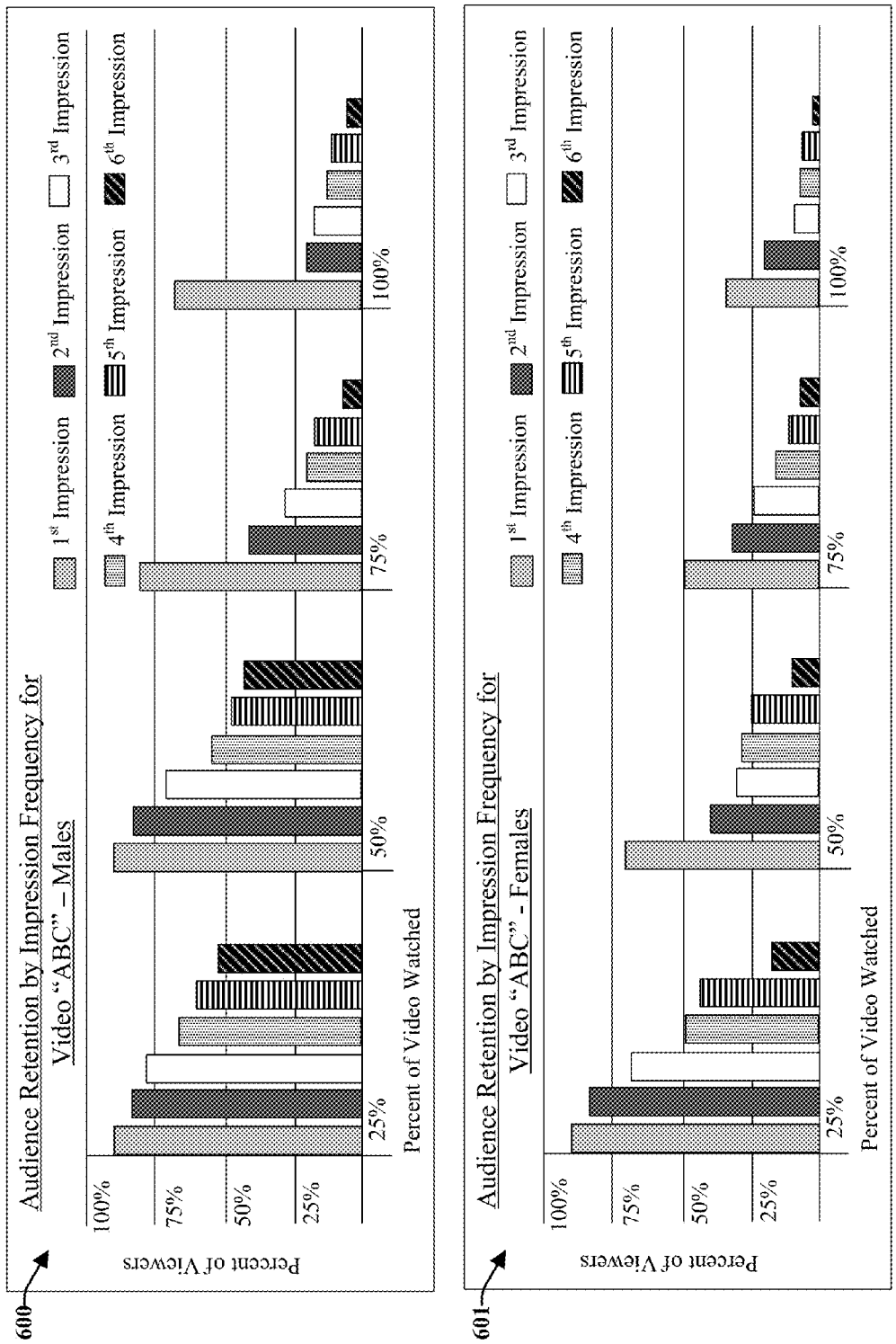
FIG. 6 presents example comparison visualizations that chart audience retention as a function of impression frequency for a video with respect to different audience subsets in accordance with various aspects and embodiments described herein.

For example, FIG. 6 illustrates example visualizations 600 and 601 comparing audience retention per impression for video "ABC" when presented to a male audience with audience retention per impression for video "ABC" when presented to a female audience. Visualizations 600 and 601 are filtered versions of visualization 200. As can be seen by comparing visualizations 600 and 601, various difference are present between the manner in which female audience members watch the video upon subsequent impressions compared to that of the males. For example, audience retention for the male audience is substantially higher than audience retention for the female audience up to the 50% point in the amount of video watched with respect to the 2nd, 3rd, 4th, 5th and 6th impression groups.

In an aspect, rather than depicting different filtered audience groups in different graphs, a visualization component 108 can generate a single graph that identifies different audience groups as a function of impression frequency and another characteristic (e.g., age, gender, location, preference, etc.).

Figure 7:
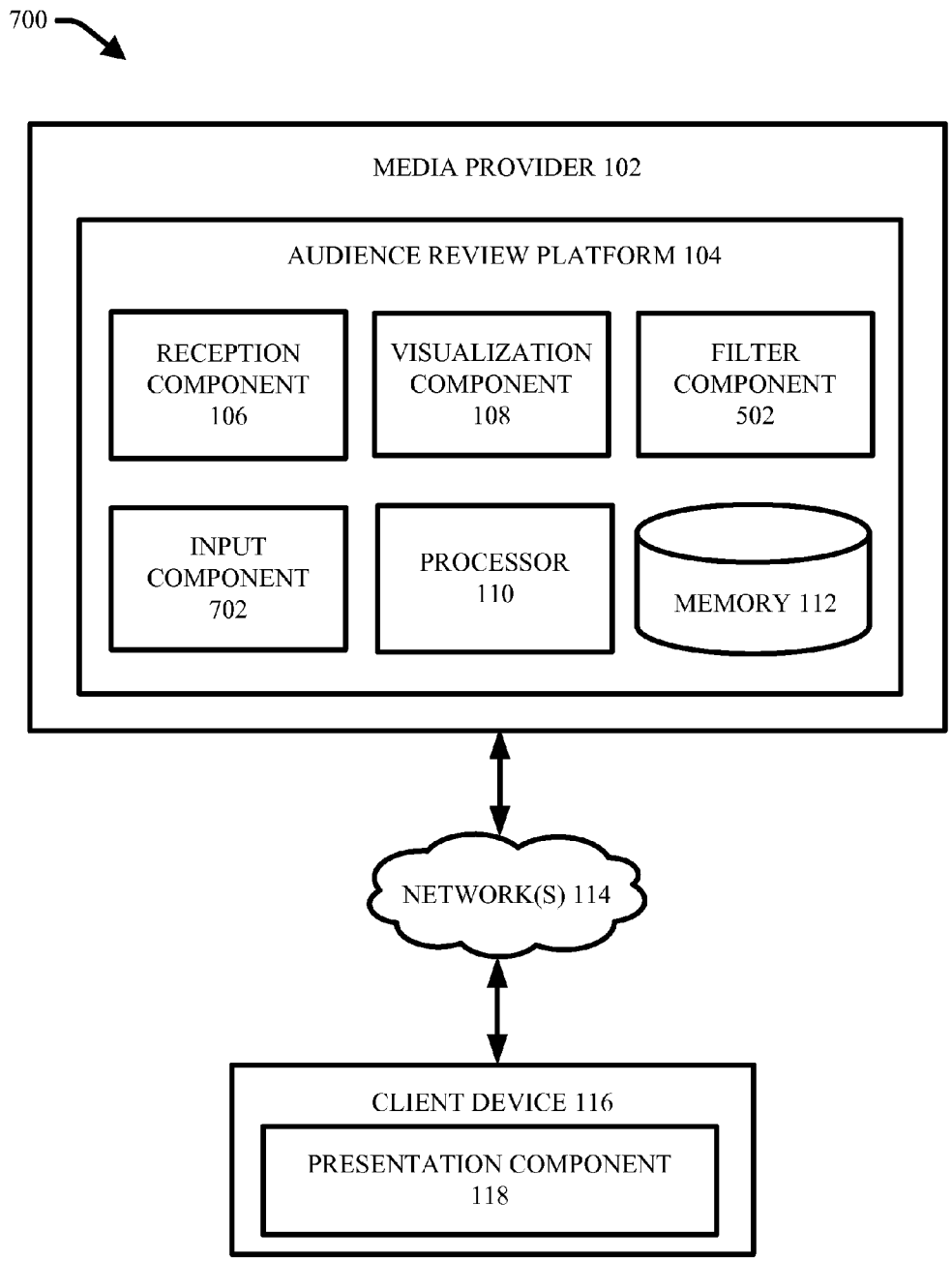
FIG. 7 illustrates another example system for visualizing video audience retention as a function of impression frequency in accordance with various aspects and embodiments described herein.

FIG. 7 presents a diagram of another example system 700 for visualizing audience retention data as a function of impression frequency, in accordance with various aspects and embodiments described herein. System 700 includes same or similar features and functionalities as system 500 with the addition of input component 702 to audience review platform 104. Repetitive description of like elements employed in respective embodiments of systems described herein is omitted for sake of brevity.

Input component 702 is configured to receive user input regarding desired features of a visualization so that visualization component 108 can generate custom visualizations for users based on their needs. For example, input component 702 can configure a user interface for generation at client device 116 (e.g., via presentation component 118) that allows a user to select characteristics of a visualization for generation by visualization component 108. For example, via the user interface, input component 702 can receive selection of a video and a request for a visualization of that video related to how the video has been consumed by viewers with respect to various comparison metrics. For example, input component 702 can receive a request for a visualization that graphically depicts viewer retention for the video as a function of impression frequency. In response to the request, visualization component 108 can generate an appropriate visualization as described herein (e.g., visualizations 200, 300, 400, 600, 601 and the like).

In an aspect, in association with the request for the visualization that graphically depicts viewer retention for the video as a function of impression frequency, input component 702 can receive selection of a type of visualization desired (e.g., a bar graph, a line graph, a three dimension graph, etc.). In addition, input component 702 can receive input regarding the number of impression groups desired for inclusion in the visualization. Input component 702 can also receive user input regarding the axes of the graph with respect to correspondence (e.g., what the respective axes represent) and granularity.

Input component 702 can also receive user selection of other types of comparison visualizations between user video consumption data based on impression frequency. For example, rather than receiving a request for a visualization that graphically depicts viewer retention for a video as a function of impression frequency, input component 702 can receive a request for a visualization that graphically depicts video interaction (e.g., pausing, fast forwarding, rewinding, etc.) for the video as a function of impression frequency. In another example, input component 702 can receive a request for a visualization that graphically depicts hyperlink selection for the video as a function of impression frequency. In yet another example, input component 702 can receive a request for a visualization that graphically depicts video advertisement conversion as a function of impression frequency.

In addition, input component 702 can receive selection of various filters to apply to a visualization regarding audience subtypes represented in by a visualization. For example, input component 702 can receive selection of one or more filters that restrict audience members based on a demographic characteristic, a location, a context, a social affiliation, a user interest etc.

Figure 8:
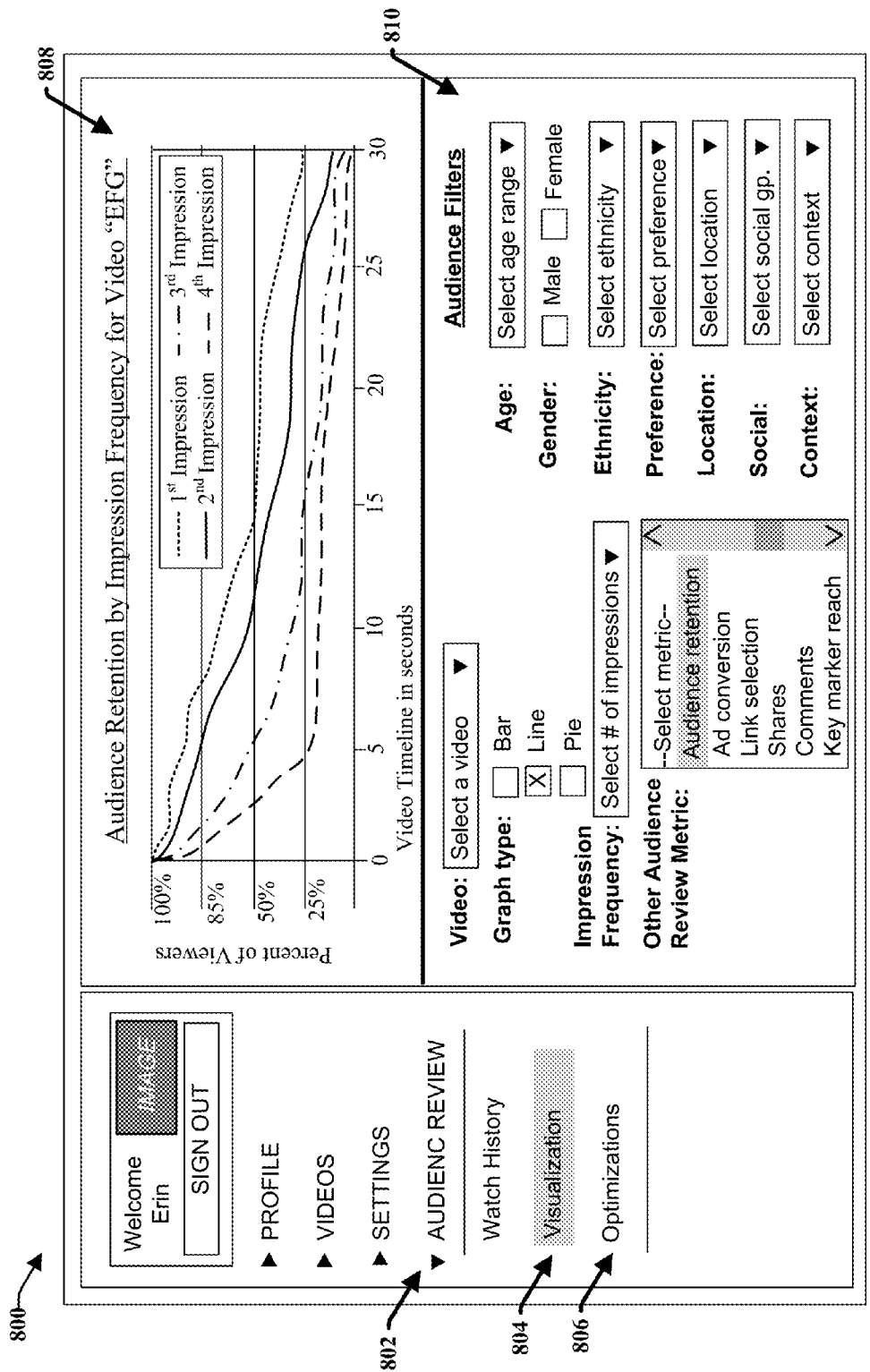
FIG. 8 present an example user interface that facilitates receiving input regarding generation of a visualization that charts aspects of watch history data as a function of impression frequency in accordance with various aspects and embodiments described herein.

FIG. 8 depicts an exemplary user interface 800 that facilitates reviewing audience watch history information in accordance with aspects and embodiments described herein. In particular, interface 800 depicts a user account or profile for user "Erin" that facilitates reviewing watch history information regarding user consumption of videos that Erin has been granted authority to review the watch history information thereof. For example, the left side of the interface includes various menu options that organize access to information regarding Erin's profile, information regarding videos associated with Erin (e.g., videos created and/or controlled by Erin on her channel), settings, and audience review information 802. The audience review information 802 tab can allow Erin to review information regarding how her video has been viewed/watched and otherwise consumed by users. In an aspect, the audience review information tab 802 can include various sub-menu options, including an option to review user watch history data, an option to generate a visualization 804 to facilitate analyzing watch history data, and an option to view optimization suggestions 806 associated with improving aspects associated with consumption of her videos based on automated analysis of a generated visualization (e.g., discussed infra with respect to FIG. 9).

In an aspect, selection of the visualization sub-menu option 804 results in the generation of sections 808 and 810. Section 810 provides an interactive input menu that allows Erin to input requirements (e.g., via selection boxes and/or drop down menus) for a custom visualization that facilitates analysis of the watch history information for a selected video. For example, section 810 includes options for selection of a video for which to generate a visualization, selection of a graph type, selection of a number of impression frequencies to consider, selection of another audience review metric for which to analyze the impression frequencies and selection of one or more audience filters (e.g., age, gender, ethnicity, preference, location, social group, and context). Section 808 can display a generated visualization based on the criteria selected in section 810. In an aspect, as a user changes selection criteria in section 810, the visualization provided in section 708 is dynamically updated.

Figure 9:
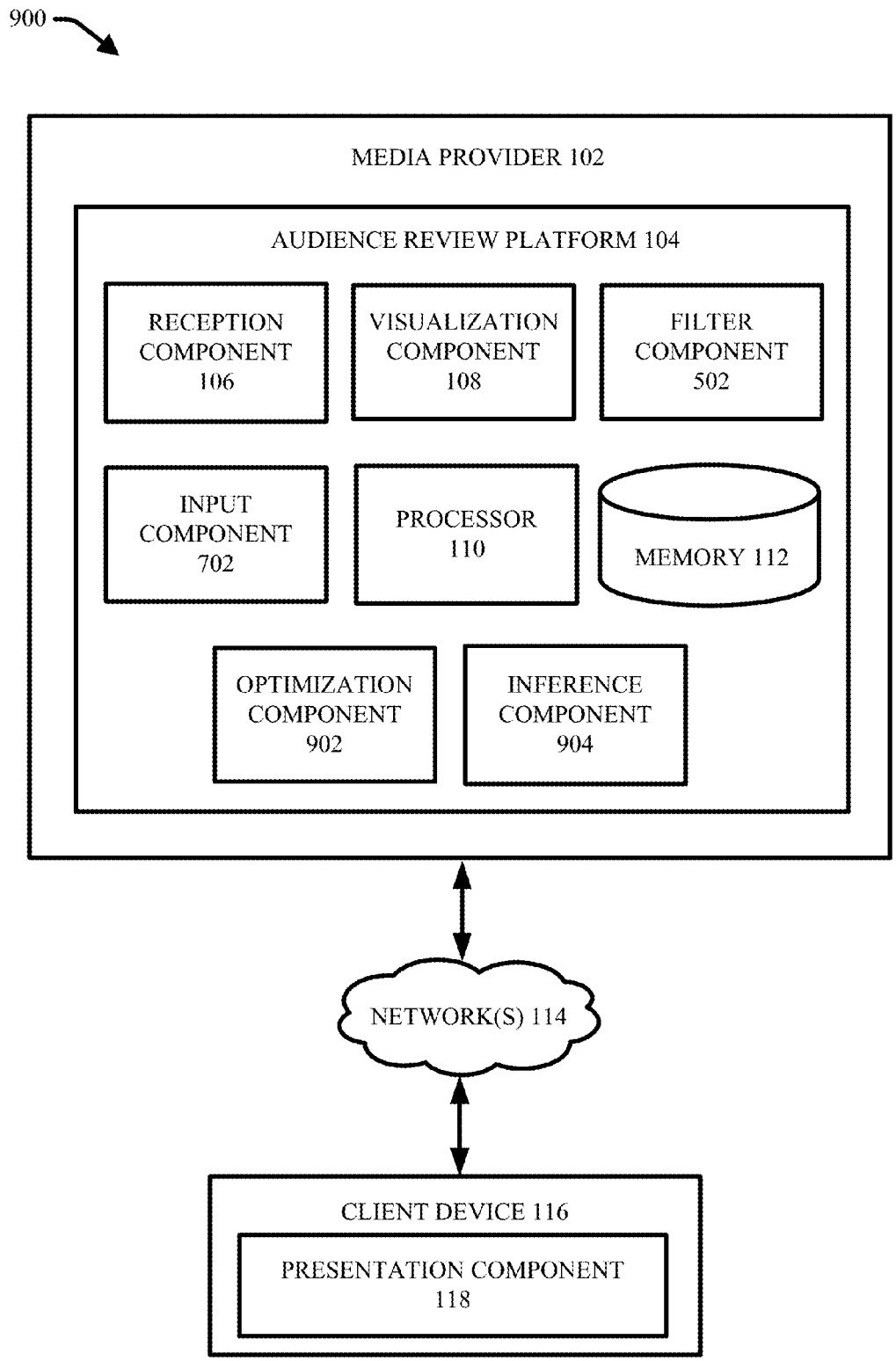
FIG. 9 illustrates another example system for visualizing video audience retention as a function of impression frequency in accordance with various aspects and embodiments described herein.

FIG. 9 presents a diagram of another example system 900 for visualizing audience retention data as a function of impression frequency, in accordance with various aspects and embodiments described herein. System 900 includes same or similar features and functionalities as system 700 with the addition of optimization component 902 and inference component 904 to audience review platform 104. Repetitive description of like elements employed in respective embodiments of systems described herein is omitted for sake of brevity.

Optimization component 902 is configured to provide suggested changes associated with placement of a video and creation of new videos based on analysis of visualizations and associated data relating video consumption and impression frequency. In an aspect, optimization component 902 is configured to analyze a visualization generated by visualization component 108 and infer placement tactics for a video to increase total audience retention with respect to frequency at which the video is viewed. The placement tactics can account for audience types and in the case of video advertisement, channels and or other videos in which the video advertisements are associated (e.g., as a pre-roll advertisement, in-video advertisement, post-video advertisement, etc.). Optimization component 902 can provide the placement tactics to an owner or manager (e.g., or entity otherwise in control of the placement of the video) of the video to facilitate advising the owner regarding how to chose where to place the video (e.g., where the video is an advertisement, what users to target with the video advertisement). For example, placement tactics outlining promising audiences to target for repeat exposure, maximum repeat exposures, context for repeat exposures, etc. of a video advertisement can influence video advertisers when bidding for advertisement placement opportunities as well as creating new and more enticing videos.

In an aspect, optimization component 902 can infer or determine a maximum impression threshold for which to present the video to users. According to this example, after a user has been presented a video a number of times equal the threshold, the user will no longer be presented the video. Optimization component 902 can also tailor impression placement thresholds based on user groups or subsets (e.g., threshold is based on a characteristic of a user subset, such as age, gender interest, etc.) as well as individual users (e.g., threshold is set for user John Doe based on his previous watch history).

In another aspect, optimization component 902 can identify different user groups to target for repeat exposure to a video based on visualization analysis. For example, with reference to FIG. 6, based on comparison of visualizations 600 and 601 representing the male and female audiences, optimization component 902 can determine or infer that repeat exposure of video ABC to the male audience at least up to three times is more beneficial than repeat exposure to the female audience. Optimization component 902 can also infer or determine impression thresholds and targeted audience groups for repeat exposure based on analysis of hyperlink selection with respect to impression frequency in order to increase overall hyperlink selection (particularly with respect to advertisement conversion).

Inference component 904 is configured to provide for or aid in various inferences or determinations associated with aspects of audience review platform 104. For example, inference component 904 can facilitate optimization component 902 with inferring placement tactics for a video to increase total audience retention with respect to frequency at which the video is viewed. In aspect, all or portions of media provider 102 can be operatively coupled to inference component 904. Moreover, inference component 904 can be granted access to all or portions of remote content sources, external information sources and client devices (e.g., client device 116).

In order to provide for or aid in the numerous inferences described herein, inference component 904 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, such as by $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 10:
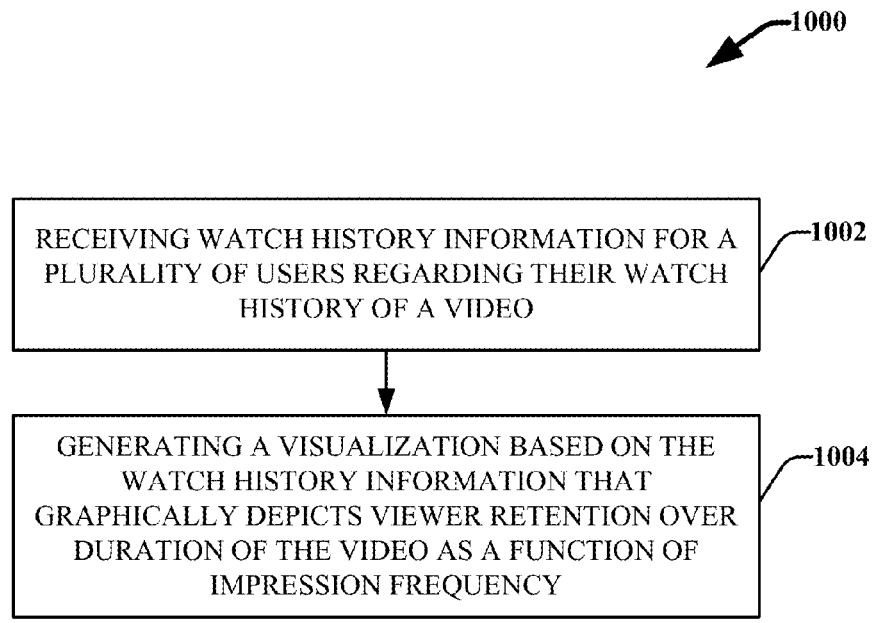
FIG. 10 is a flow diagram of an example method for visualizing video audience retention as a function of impression frequency in accordance with various aspects and embodiments described herein.

In view of the example systems and/or devices described herein, example methods that can be implemented in accordance with the disclosed subject matter can be further appreciated with reference to flowcharts in FIGS. 10-11. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 10 illustrates a flow chart of an example method 1000 for visualizing video audience retention as a function of impression frequency, in accordance with various aspects and embodiments described herein. At 1002, watch history information for a plurality of users regarding their watch history of a video is received (e.g., via reception component 106). At 1004, a visualization is generated based on the watch history information that graphically depicts viewer retention over duration of the video as a function of impression frequency (e.g., via visualization component 108). As previously described, viewer retention over the duration of the video refers to percentages of the plurality of users that have viewed the video up to respective points in the video, and impression frequency relates to number of times the video has been presented to respective users of the plurality of users.

In an aspect the visualization accounts for impression frequency by defining a plurality of viewer buckets, wherein each bucket includes watch history data for different user impressions of the video. For example, a first impression bucket will include watch history data based on users' first times seeing the video, a second impression bucket will include watch history data based on users' second times seeing the video, etc. A single viewer that has seen the video more than once will be accounted for in each impression bucket corresponding to the number of times the viewer has seen the video. For example, watch history data for a user's first impression of the video will be accounted for in the first impression bucket, watch history data for the same user's second impression of the video will be accounted for in the second impression bucket, etc.

FIG. 11 illustrates a flow chart of another example method 1100 for visualizing video audience retention as a function of impression frequency, in accordance with various aspects and embodiments described herein. At 1102, watch history information for a plurality of users regarding their watch history of a video is received (e.g., via reception component 106). At 1104, a visualization is generated based on the watch history information that graphically depicts viewer retention over duration of the video as a function of impression frequency (e.g., via visualization component 108). At 1106, the plurality of users are filtered into a subset of the plurality of users based on a demographic characteristic associated with the subset of the plurality of users (e.g., via filter component 502). For example, the plurality of users can be filtered based on age, gender, user preference, affiliation with a same social circle, affiliation with a same social network, location, language, context, etc. At 1108, another visualization is generated (e.g., via visualization component 108) that compares the viewer retention over the duration of the video for different groups of the subset of the plurality of users, wherein the different groups of the subset of the plurality of users are defined based on number of times respective users of the different groups were presented the video.

EXAMPLE OPERATING ENVIRONMENTS

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 12:
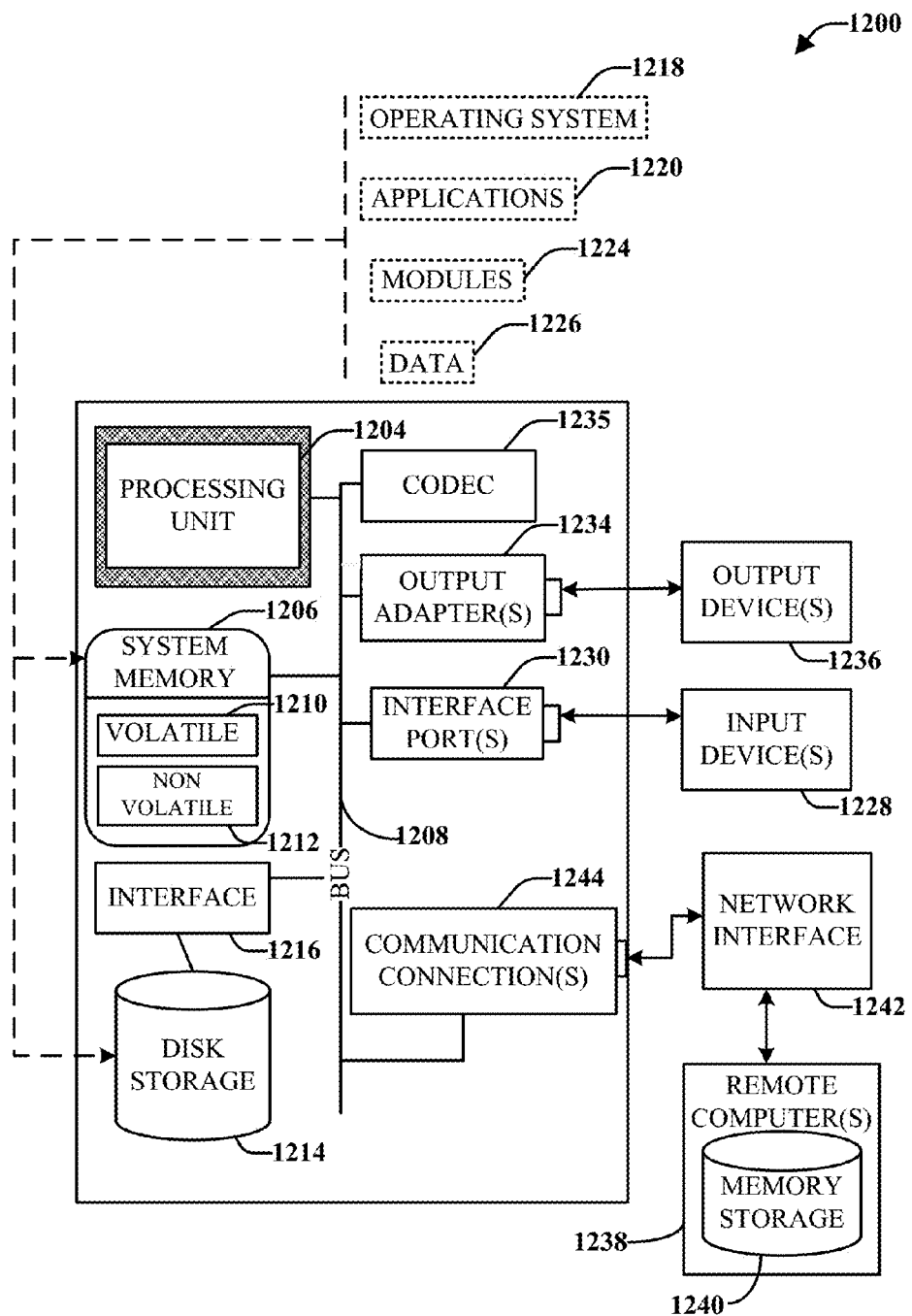
FIG. 12 is a schematic block diagram illustrating a suitable operating environment in accordance with various aspects and embodiments.

With reference to FIG. 12, a suitable environment 1200 for implementing various aspects of the claimed subject matter includes a computer 1202. The computer 1202 includes a processing unit 1204, a system memory 1206, a codec 1235, and a system bus 1208. The system bus 1208 couples system components including, but not limited to, the system memory 1206 to the processing unit 1204. The processing unit 1204 can be any of various available processors. Dual microprocessors and other multiprocessor architectures also can be employed as the processing unit 1204.

The system bus 1208 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13124), and Small Computer Systems Interface (SCSI).

The system memory 1206 includes volatile memory 1210 and non-volatile memory 1212. The basic input/output system (BIOS), containing the basic routines to transfer information between elements within the computer 1202, such as during start-up, is stored in non-volatile memory 1212. In addition, according to present innovations, codec 1235 may include at least one of an encoder or decoder, wherein the at least one of an encoder or decoder may consist of hardware, a combination of hardware and software, or software. Although, codec 1235 is depicted as a separate component, codec 1235 may be contained within non-volatile memory 1212. By way of illustration, and not limitation, non-volatile memory 1212 can include read only memory (ROM), programmable ROM (PROM), electrically programmable ROM (EPROM), electrically erasable programmable ROM (EEPROM), or flash memory. Volatile memory 1210 includes random access memory (RAM), which acts as external cache memory. According to present aspects, the volatile memory may store the write operation retry logic (not shown in FIG. 12) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1202 may also include removable/non-removable, volatile/non-volatile computer storage medium. FIG. 12 illustrates, for example, disk storage 1214. Disk storage 1214 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1214 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1214 to the system bus 1208, a removable or non-removable interface is typically used, such as interface 1216.

It is to be appreciated that FIG. 12 describes software that acts as an intermediary between users and the basic computer resources described in the suitable operating environment 1200. Such software includes an operating system 1218. Operating system 1218, which can be stored on disk storage 1214, acts to control and allocate resources of the computer system 1202. Applications 1220 take advantage of the management of resources by operating system 1218 through program modules 1224, and program data 1226, such as the boot/shutdown transaction table and the like, stored either in system memory 1206 or on disk storage 1214. It is to be appreciated that the claimed subject matter can be implemented with various operating systems or combinations of operating systems.

A user enters commands or information into the computer 1202 through input device(s) 1228. Input devices 1228 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1204 through the system bus 1208 via interface port(s) 1230. Interface port(s) 1230 include, for example, a serial port, a parallel port, a game port, and a universal serial bus (USB). Output device(s) 1236 use some of the same type of ports as input device(s). Thus, for example, a USB port may be used to provide input to computer 1202, and to output information from computer 1202 to an output device 1236. Output adapter 1234 is provided to illustrate that there are some output devices 1236 like monitors, speakers, and printers, among other output devices 1236, which require special adapters. The output adapters 1234 include, by way of illustration and not limitation, video and sound cards that provide a means of connection between the output device 1236 and the system bus 1208. It should be noted that other devices and/or systems of devices provide both input and output capabilities such as remote computer(s) 1238.

Computer 1202 can operate in a networked environment using logical connections to one or more remote computers, such as remote computer(s) 1238. The remote computer(s) 1238 can be a personal computer, a server, a router, a network PC, a workstation, a microprocessor based appliance, a peer device, a smart phone, a tablet, or other network node, and typically includes many of the elements described relative to computer 1202. For purposes of brevity, only a memory storage device 1240 is illustrated with remote computer(s) 1238. Remote computer(s) 1238 is logically connected to computer 1202 through a network interface 1242 and then connected via communication connection(s) 1244. Network interface 1242 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1244 refers to the hardware/software employed to connect the network interface 1242 to the bus 1208. While communication connection 1244 is shown for illustrative clarity inside computer 1202, it can also be external to computer 1202. The hardware/software necessary for connection to the network interface 1242 includes, for exemplary purposes only, internal and external technologies such as, modems including regular telephone grade modems, cable modems and DSL modems, ISDN adapters, and wired and wireless Ethernet cards, hubs, and routers.

Figure 13:
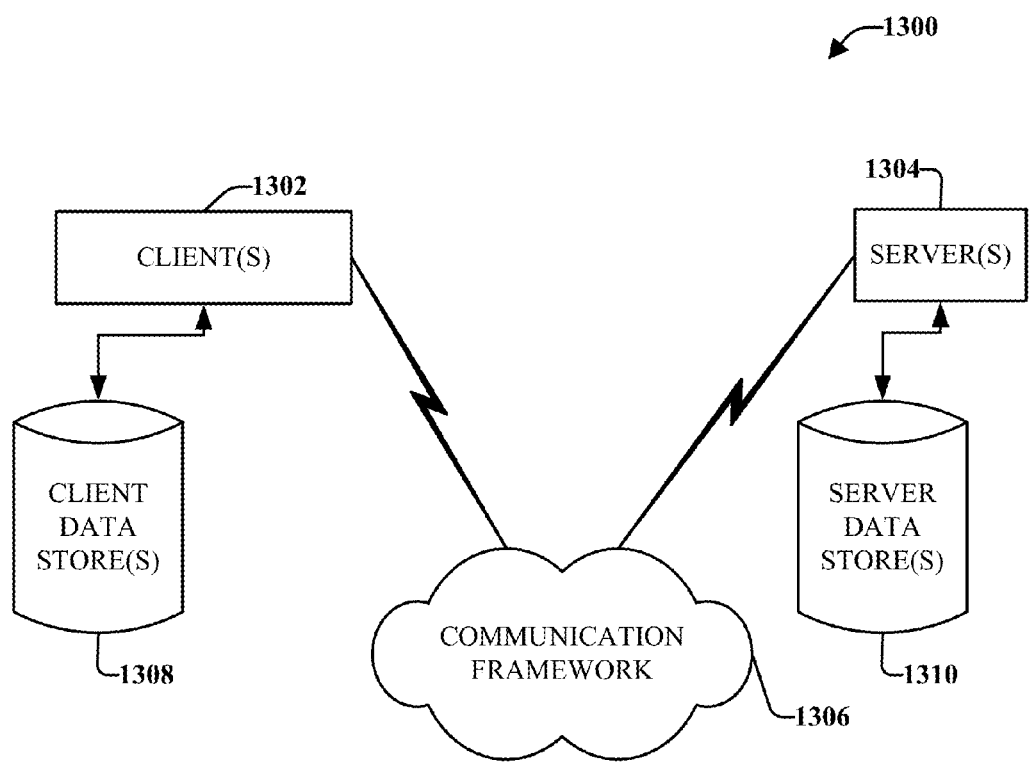
FIG. 13 is a schematic block diagram of a sample-computing environment in accordance with various aspects and embodiments.

Referring now to FIG. 13, there is illustrated a schematic block diagram of a computing environment 1300 in accordance with this disclosure. The system 1300 includes one or more client(s) 1302 (e.g., laptops, smart phones, PDAs, media players, computers, portable electronic devices, tablets, and the like). The client(s) 1302 can be hardware and/or software (e.g., threads, processes, computing devices). The system 1300 also includes one or more server(s) 1304. The server(s) 1304 can also be hardware or hardware in combination with software (e.g., threads, processes, computing devices). The servers 1304 can house threads to perform transformations by employing aspects of this disclosure, for example. One possible communication between a client 1302 and a server 1304 can be in the form of a data packet transmitted between two or more computer processes wherein the data packet may include video data. The data packet can include a metadata, e.g., associated contextual information, for example. The system 1300 includes a communication framework 1306 (e.g., a global communication network such as the Internet, or mobile network(s)) that can be employed to facilitate communications between the client(s) 1302 and the server(s) 1304.

Communications can be facilitated via a wired (including optical fiber) and/or wireless technology. The client(s) 1302 include or are operatively connected to one or more client data store(s) 1308 that can be employed to store information local to the client(s) 1302 (e.g., associated contextual information). Similarly, the server(s) 1304 are operatively include or are operatively connected to one or more server data store(s) 1310 that can be employed to store information local to the servers 1304.

In one embodiment, a client 1302 can transfer an encoded file, in accordance with the disclosed subject matter, to server 1304. Server 1304 can store the file, decode the file, or transmit the file to another client 1302. It is to be appreciated, that a client 1302 can also transfer uncompressed file to a server 1304 and server 1304 can compress the file in accordance with the disclosed subject matter. Likewise, server 1304 can encode video information and transmit the information via communication framework 1306 to one or more clients 1302.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
a memory that stores computer executable components; and
a processor that executes at least the following computer executable components stored in the memory:
a reception component configured to receive watch history information for a plurality of viewers regarding their watch history of a video; and
a visualization component configured to generate a visualization, on a display device, based on the watch history information that graphically depicts viewer retention over duration of the video as a function of impression frequency, wherein the visualization graphically depicts respective groups of a plurality of groups of viewers as distinct elements over the duration of the video, each group represents a distinct impression frequency number from 1 to N, where N is an integer greater than one, and an impression frequency number indicates a repetition number of presentation of the video to a same viewer; and
an optimization component configured to determine maximum impression thresholds for the video based upon an analysis of the viewer retention over the duration of the video as the function of the impression frequency, wherein a maximum impression threshold defines a maximum repetition for presentation of the video to a viewer, and wherein a maximum impression threshold is determined for at least two different user groups based on respective characteristics of the user groups, the characteristics including at least one of ages associated with the user groups or interests of the user groups.

2. The system of claim 1, wherein viewer retention over the duration of the video indicates numbers of the plurality of viewers viewing the video at respective points in the video, and wherein impression frequency relates to numbers of times the video has been presented to respective viewers of the plurality of viewers.

3. The system of claim 1, further comprising a filter component configured to filter the plurality of viewers into a subset of the plurality of viewers based on a demographic characteristic associated with the subset of the plurality of viewers, and
wherein the visualization component is configured to generate another visualization to reflect an updated version of the visualization restricted to watch history information based on the subset of the plurality of viewers.

4. The system of claim 3, further comprising:
an input component configured to receive input requesting the other visualization and identifying the demographic characteristic, wherein the visualization component is configured to generate the other visualization in response to the input.

5. The system of claim 1, wherein the visualization comprises a graph comprising:
a first axis representing distinct incremental amounts of the video watched; and
a second axis, perpendicular to the first axis, representing distinct incremental amounts of viewers that viewed the video.

6. The system of claim 5, wherein the distinct elements comprise sets of bars that respectively extend from the first axis as a function of the second axis, wherein the sets of bars respectively comprise a plurality of sub-bars, and each sub-bar corresponds to a group of the plurality of groups.

7. The system of claim 6, wherein the visualization differentiates the plurality of sub-bars from one another in appearance.

8. The system of claim 5, wherein the distinct elements comprise a plurality of lines respectively formed via points plotted as a function of the first axis and the second axis based on the viewer retention over the duration of the video as a function of impression frequency, wherein each line represents a group of the plurality of groups.

9. The system of claim 1, further comprising a presentation component configured to display the visualization via a graphical user interface (GUI) wherein the GUI is adaptively configured based at least in part on display characteristics of a rendering device.

10. The system of claim 1, wherein the optimization component is further configured to determine the at least one maximum impression threshold for the video based upon an analysis of hyperlink selection with respect to the impression frequency.

11. A method comprising:
receiving, by a system including a processor, watch history information for a plurality of users regarding their watch history of a video;
generating, by the system on a display device, a visualization based on the watch history information that graphically depicts user retention over duration of the video as a function of impression frequency, wherein the visualization graphically depicts respective groups of a plurality of groups of users as distinct elements over the duration of the video, each group represents a distinct impression frequency number from 1 to N, where N is an integer greater than one, and an impression frequency number indicates a repetition number of viewing of the video by a same user; and
determining, by the system, maximum impression thresholds for the video based upon an analysis of the user retention over the duration of the video as the function of the impression frequency, wherein a maximum impression threshold defines a maximum repetition for presentation of the video to a user, and wherein a maximum impression threshold is determined for at least two different user groups based on respective characteristics of the user groups, the characteristics including at least one of ages associated with the user groups or interests of the user groups.

12. The method of claim 11, wherein user retention over the duration of the video indicates numbers of the plurality of users viewing the video at respective points in the video, and wherein impression frequency relates to numbers of times the video has been presented to respective users of the plurality of users.

13. The method of claim 11, further comprising:
filtering, by the system, the plurality of users into a subset of the plurality of users based on a demographic characteristic associated with the subset of the plurality of users; and generating, by the system, another visualization to reflect an updated version of the visualization restricted to watch history information based on the subset of the plurality of users.

14. The method of claim 13, further comprising:

receiving, by the system, input requesting the other visualization and identifying the demographic characteristic, wherein the generating the other visualization is responsive to the input.

15. The method of claim 11, wherein the visualization comprises a graph comprising:

- a first axis corresponding to distinct incremental amounts of the video watched; and
- a second axis, perpendicular to the first axis, corresponding to distinct incremental amounts of viewers that viewed the video.

16. The method of claim 15, wherein the distinct elements comprise sets of bars that respectively extend from the first axis as a function of the second axis, wherein the sets of bars respectively comprise a plurality of sub-bars, and each sub-bar corresponds to a group of the plurality of groups.

17. The method of claim 15, wherein the distinct elements comprise a plurality of lines respectively formed via points plotted as a function of the first axis and the second axis based on the user retention over the duration of the video as a function of impression frequency, wherein each line represents a group of the plurality of groups.

18. A non-transitory computer-readable medium having instructions stored thereon that, in response to execution, cause a system including a processor to perform operations comprising:

receiving information for a plurality of viewers regarding their watch history of a video;

generating a visualization, on a display device, based on the information that graphically depicts viewer retention over duration of the video as a function of impression frequency, wherein the visualization graphically depicts respective groups of a plurality of groups of viewers as distinct elements over the duration of the video, each group represents a distinct impression frequency number from 1 to N, where N is an integer greater than one, and an impression frequency number indicates a repetition number of presentation of the video to a same viewer; and determining maximum impression thresholds for the video based upon an analysis of the viewer retention over the duration of the video as the function of the impression frequency, wherein a maximum impression threshold defines a maximum repetition for presentation of the video to a viewer, and wherein a maximum impression threshold is determined for at least two different user groups based on respective characteristics of the user groups, the characteristics including at least one of ages associated with the user groups or interests of the user groups.

* * * * *